United States Patent Office

3,542,721
Patented Nov. 24, 1970

3,542,721
METHOD FOR TREATING SYNTHETIC RUBBER
Saburo Minekawa, Yokohama, Koretaka Yamaguchi, Kawasaki-shi, Kazuo Toyomoto, Yokohama, and Kuniaki Sakamoto, Tokyo, Japan, assignors to Asahi Kasei Kogyo Kabushiki Kaisha, Osaka, Japan, a Japanese corporation
No Drawing. Filed Dec. 20, 1966, Ser. No. 603,101
Claims priority, application Japan, Dec. 27, 1965, 41/80,056; Nov. 5, 1966, 41/72,588
Int. Cl. C08d 9/00
U.S. Cl. 260—33.6                                5 Claims

ABSTRACT OF THE DISCLOSURE

A method for producing a synthetic rubber substantially free from gel and having excellent processability by heat treating a solution-polymerized synthetic rubber containing more than 10% by weight of 1,3-butadiene with 0.005 to 2 parts by weight of maleic anhydride and/or maleic acid and 0.05 to 10 parts by weight of azobisisobutyronitrile per 100 parts by weight of the synthetic rubber at a temperature of 20° to 150° C. for a period of 10 min. to 200 hrs. In said treatment, an organo aluminum mono- and/or di-chloride may be added to enable the treatment to be effectvely completed at a lower temperature in a shorter time.

---

The present invention relates to a novel method for treating synthetic rubber. More particularly, the present invention relates to an improved method for treating solution polymerized synthetic rubber which contains as a composition at least 10% by weight of 1,3-butadiene having very little or no gel content.

As compared with a rubber having a large gel content, a rubber having little or no gel content, such as less than 5% by weight of gel is generally excellent in processability. The properties and appearances of general synthetic rubber products having little or no gel content are fine.

Accordingly, the provision of a method for the production of a synthetic rubber having little or no gel content is a very important problem in the industrial production of synthetic rubber.

However, the production of synthetic rubbers having such a low gel content requires generally high-degree techniques, and it is difficult to obtain synthetic rubbers of relatively high Mooney viscosity, i.e. usually higher than a Mooney viscosity of 40 (reading after revolving for 4 minutes on a large-sized rotor by the use of Mooney's viscosimeter) without gel formation or with substantially no gel formation.

Furthermore, one of the problems in the production of synthetic rubbers of high Mooney viscosity to obtain an oil extended polymer by solution polymerization is that the viscosity of an inert solvent containing such synthetic rubber of high Mooney viscosity becomes abnormally high and industrial transportation and handling are accompanied by difficulties.

It is obvious that the requirement for a large amount of inert solvent to lessen the concentration of synthetic rubber in order to lower the viscosity of the solution is economically disadvantageous.

On the other hand, synthetic rubbers prepared by solution polymerization according to the conventional method have a tendency to flow at room temperature and special handling of the products in transportation and storage is often required.

Moreover, synthetic rubbers obtained by the conventional method is inferior in processability, mill processability, miscibility with fillers such as carbon black on Banbury mixer, extrusion properties, and requires troublesome handling or extremely long processing time. Thus, economically important problems remain.

As a method which solves the above production problems and by which a synthetic rubber of high Mooney viscosity is produced, there is known a method wherein Lewis acids such as titanium tetrachloride, diethyl aluminum chloride, or proton donor substances such as alcohols, carboxylic acids, primary or secondary amines are reacted with polybutadiene rubber polymerized in the presence of Ziegler type catalysts or lithium based catalysts to bridge cationically, in order to increase the Mooney viscosity of polybutadiene and to improve the flow properties and processability (Rubber Age, December, pp. 410–415, 1964; British Pat. No. 992,210; Belgian Pat. No. 667,733; Belgian Pat. No. 667,734; Belgian Pat. No. 667,735). According to such a method, however, the reaction proceeds so rapidly that the reaction is called a "Jump Reaction." Thus, a large amount of insoluble gel is present in the polybutadiene rubber unless the stirring rate is exceedingly rapid when the above additives are mixed, and it is difficult to obtain a product article having industrially sufficient practicability.

Additionally, British Pat. No. 952,021; British Pat. No. 1,018,364; British Pat. No. 996,426, etc. are known as the methods for preventing the flow of the polybutadiene at room temperature.

The above methods are methods for prevening the flow at room temperature by reacting the polybutadiene with a peroxide or hydroperoxide in a particular amount alone or in combination with a compound selected from the group consisting of maleic anhydride and maleic acid. However, the defect in such method is that the hydroxide is very reactive with the polybutadiene and the temperature dependability of the reaction velocity is exceedingly high. This fact means that when there is any variation of temperature, cross linking occurs partly and gel is liable to form. It is difficult to obtain a uniform cross linking polybutadiene rubber and good product articles can not be obtained.

Furthermore, a problem in the treatment of synthetic rubbers with peroxides or hydroperoxides is the remarkable difference in the degree of cross linking depending on the amount of peroxide or hydroperoxide added.

The above fact indicates that when the peroxide or hydroperoxide is unevenly dispersed, the cross linking reaction is carried out abnormally where the concentration is high and gel is formed, and a true uniform cross linked polybutadiene rubber can not be obtained.

The object of the present invention is to provide a method for obtaining a synthetic rubber which contains substantially no gel, is uniformly cross linked, has improved flow properties at room temperature and excellent processability.

Another object is to provide an oil extended synthetic rubber having a very fine quality which is oil extended to a high degree, by obtaining a synthetic rubber of high Mooney viscosity having substantially no gel and which is uniformly cross linked and employing it in said oil extended synthetic rubber.

A further object is to provide exceedingly excellent rubber composition as cured rubber articles by further mixing various fillers or process oil with the thus-obtained synthetic rubber or oil extended synthetic rubber.

We have achieved the above objects by mixing 0.005–2 parts by weight of maleic anhydride or maleic acid and 0.05–10 parts by weight of azobisisobutyronitrile per 100 parts by weight with a synthetic rubber obtained by solution polymerization and containing at least 10% by weight of 1,3-butadiene, and heating the above mixture to 20°–150° C.

Moreover, we have achieved the objects by adding an organic aluminum compound of the formula, $$AlR_nX_{3-n}$$

wherein R is a lower alkyl radical, X is at least one halogen selected from bromine, chlorine and iodine, and $n$ is an integer from 1–3, to the above azobisisobutyronitrile and maleic anhydride or maleic acid at a relatively lower temperature and for a relatively shorter period of time as compared with the case without the addition of said organic aluminum compound.

In general, the cross linking reaction is not effected when a synthetic rubber is treated with maleic anhydride or maleic acid alone. Additionally, it has been known for a long time that cross linking never occurs with azobisisobutyronitrile alone.

We have now found that the Mooney viscosity can be increased and the cross linking reaction can be carried out by reacting the two compounds each of which alone undergoes almost no cross linking, without any formation of gel or with almost no formation thereof.

Additionally, it has been discovered that the reaction with the joint use of maleic anhydride or maleic acid and azobisisobutyronitrile proceeds relatively gradually and inhibits the formation of gel and that actually an extremely advantageous result is obtained.

Moreover, the excellent features of the method for treatment according to the present invention is compared with the conventional treatment with a peroxide or hydroperoxide and the treatment with cationic catalysts, are that when the treatment is effected with maleic anhydride and/or maleic acid together with azobisisobutyronitrile, the degree of cross-linking does not vary by changing the amount of these treating agents added.

Within a certain range of concentrations, the degree of cross linking is not varied very much and the increase in Mooney viscosity is also varied little depending on the amount of azobisisobutyronitrile added as a radical initiator.

The above fact leads to an extremely advantageous characteristic when these methods are carried out on an industrial scale and means that a synthetic rubber having a relatively uniform Mooney viscosity can be easily made and which contains almost no gel and is uniformly cross linked.

The present invention is, generally, a method wherein a solution polymerized synthetic rubber is obtained by the polymerization of 1,3-butadiene or copolymerization of 1,3-butadiene and a copolymerizable monomer and subsequently a cross linked synthetic rubber is produced by applying the process of the present invention. Of course, a solid synthetic rubber previously obtained may be dissolved in an appropriate solvent and thereafter the process of the present invention may be applied to the thus-obtained solution to process the synthetic rubber.

In the present method, 0.005–2 parts by weight of maleic anhydride and(or) maleic acid per 100 parts by weight of the synthetic rubber are suitably employed. When less than 0.005 part by weight is used, the Mooney viscosity of the synthetic rubber does not increase. On the contrary, when more than 2 parts by weight are used, the Mooney viscosity of the synthetic rubber increases, but a gel is formed occasionally and the quality of the synthetic rubber obtained by the reaction is degraded.

Within the above range of maleic anhydride and(or) maleic acid, substantially no formation of gel occurs, cross linking is effected and the Mooney viscosity is increased. The quality of the synthetic rubber obtained by the reaction is incomparably excellent especially as regards the low content of gel and good processability.

Mixed maleic anhydride and maleic acid of any proportion, of course, may be employed.

0.05–10 parts by weight of azobisisobutyronitrile per 100 parts by weight of the synthetic rubber may be suitably employed. Within the above range, an increase of Mooney viscosity due to the amount of azobisisobutyronitrile is relatively slow. Thus, control of the amount of azobisisobutyronitrile used is easier as compared with control of the amounts of maleic anhydride and maleic acid. When the amount of azobisisobutyronitrile is less than 0.05 parts by weight, the cross linking reaction is not effected. Consequently, the Mooney viscosity does not increase. Moreover, when the amount of azobisisobutyronitrile is more than 10 parts by weight, the Mooney viscosity of the synthetic rubber after the reaction increases, but gel is liable to be formed and the quality of the synthetic rubber obtained by the reaction is degraded and additionally it is disadvantageous as regards cost.

In the process of the present invention, usually a reaction temperature in the range of 20°–150° C. is preferable, and 50°–110° C. is most preferable. The reaction time required is usually from 10 minutes to 200 hours, and most preferred is reacting time from 1 hour to 15 hours.

When a synthetic rubber which is solution polymerized and contains 10% by weight of 1,3-butadiene is processed with azobisisobutylronitrile and maleic anhydride and/or maletic acid as mentioned above, a product which is uniformly cross linked and has substantially no gel is obtained. Furthermore, it has been found that by mixing 0.01–10 parts by weight of an organic aluminum compound of the formula, $$AlR_nX_{3-n}$$

wherein R is a lower alkyl radical, X is at least one halogen selected from bromine, chlorine and iodine and $n$ is an integer from 1–3, with the above combined system of cross linking agent and heating the above mixture at 20°–150° C., the reaction time is remarkably shortened and the amount of azobisisobutyronitrile added may be greatly reduced to as little as 0.05–5 parts by weight.

As typical examples of the organic aluminum compounds represented by the above formula which are employed in the practice of the present invention, there are exemplified trimethylaluminum, triethylaluminum, tri-n-propylaluminum, triisopropylaluminum, tri-n-butylaluminum, tri-sec.-butylaluminum, tri-tert.butylaluminum, tri-isobutylaluminum, dimethylaluminum bromide, dimethylaluminum chloride, dimethylaluminum iodide, diethylaluminum bromide, diethylaluminum chloride, diethylaluminum iodide, di-n-propylaluminum chloride, di-n-propylaluminum iodide, diisopropylaluminum bromide, diisopropylaluminum iodide, di-n-butylaluminum bromide, di-n-butylaluminum chloride, di-n-butylaluminum iodide, diisobutylaluminum bromide, diisobutylaluminum chloride, diisobutylaluminum iodide, methylaluminum dibromide, methylaluminum diiodide, ethylaluminum diiodide, n-propylaluminum dibromide, n-propylaluminum dichloride, n-propylaluminum diiodide, methylethylaluminum bromide, methylethylaluminum chloride, methylethylaluminum iodide and the like Moreover, the amount of said organic aluminum which is used to shorten the reaction time and reduce the amount of azobisisobutyronitrile used, is 0.01–10 parts by weight, preferably 0.05–2 parts by weight of the combined cross linking agents system as azobisisobutylronitrile and maleic anhydride and/or maletic acid according to the present invention.

When the amount of organic aluminum compound is less than 0.01 part by weight, the reaction velocity is not so rapid. When the amount used is more than 10 parts by weight, the Mooney viscosity increases and the reaction velocity becomes rapid, but the formation of gel occurs.

The Mooney viscosity of the synthetic rubber obtained by solution polymerization having at least 10% of 1,3-butadiene before the reaction, ranges usually from 5 to 60, but it is not limited to such an amount. The Mooney viscosity of the synthetic rubber after the reaction is increased by at least 5 as a result of the cross linking as compared with the viscosity before the reaction.

By selecting suitable conditions in the present method, synthetic rubbers having high Mooney viscosity, i.e. a Mooney viscosity of more than 100, specifically more than 150, which synthetic rubber can not be produced without the formation of gel according to the conventional method, can be produced smoothly, and it is not so difficult to produce one having a Mooney viscosity of even 200 with substantially no formation of gel.

In general, the Mooney viscosity of a so-called oil extended synthetic rubber compounded with process oil is required to be relatively high. A synthetic rubber having such a high Mooney viscosity can be produced according to the processing method of the present invention. That is to say, one of the methods to obtain such a rubber comprises dissolving a synthetic rubber obtained by solution polymerization and containing at least 10% by weight of 1,3-butadiene in an inert organic solvent, dissolving a process oil in the thus-obtained mixture and reacting maleic anhydride and/or maleic acid and the stated amount of azibisisobutyronitrile with the above mixture. Without such limitation by the above procedure, an oil extended synthetic rubber may be obtained by adding a process oil to an inert solvent solution of a synthetic rubber having a high Mooney viscosity and obtained by the processing method of the present invention and mixing mechanically.

The processing method of the present invention is excellent as regards the cross linking of the synthetic rubber, i.e. as a method to increase the Mooney viscosity. As compared to the known method to increase the Mooney viscosity, such as a combination of maleic anhydride and maleic acid with a peroxide which is a radical initiator such as benzoyl peroxide, lauroyl peroxide or hydroperoxide and the like, the action is exceedingly mild, no gel is formed when the Mooney viscosity is increased, a uniformly cross linked synthetic rubber is formed, substantially no formation of gel is observed and the Mooney viscosity can be sharply increased.

In the above method, aliphatic hydrocarbons such as hexane, heptane, cyclohexane, methylcyclohexane, or aromatic hydrocarbons such as benzene, toluene or xylene are suitable as the inert organic solvent for industrial use from the view point of the cost and handling.

Moreover, in the practice of the present invention, the presence of oxygen inhibits the cross linking reaction and acts to effect a chain scission reaction of the synthetic rubber molecule. Accordingly, the oxygen which is present to some extent is preferable for the object of preventing the flow at room temperature without an increase of the Mooney viscosity. However, it is desirable to remove the oxygen as much as possible, since it is deleterious in order to increase the Mooney viscosity.

One of characteristics of the present invention is that the Mooney viscosity generally can not be increased substantially with azobisisobutyronitrile alone or maleic anhydride alone as mentioned above, but, the coexistence of azobisisobutyronitrile and maleic anhydride and/or maleic acid is effective for the first time to increase the Mooney viscosity. From this viewpoint, the above case is essentially different from the case wherein a hydroxide or hydroperoxide alone which is a radical initiator increases the Mooney viscosity.

There is also a disadvantage which is liable to increase the Mooney viscosity with the peroxide alone or a combination of the peroxide with the maleic anhydride and/or maleic acid.

As compared with the above methods, in the present method it is a remarkable feature that the reaction is mild and a synthetic rubber having an extremely high Mooney viscosity and substantially no gel, is obtained.

Additionally, it is a feature that the control of the reaction is easy, since there is substantially no so-called induction period and the reaction is not explosive, and when the Mooney viscosity is increased according to the present invention, the variation of Mooney viscosity of the products is small and the product articles are of great value.

Thus, a practically useful synthetic rubber is obtained according to the present invention. Furthermore, as the characteristics of the synthetic rubber obtained according to the present invention, a synthetic rubber having extremely excellent processability, that is to say, good mill processability, miscibility in mixing with various fillers in the Banbury mixer, extrusion properties and the like can be obtained.

The present method is useful not only in the case of the polybutadiene rubber produced by solution polymerization, but also in the case of all synthetic rubbers containing at least 10% by weight of 1,3-butadiene and produced by solution polymerization. In general, although the treatment of the present invention may be applied to the solution which is obtained by dissolving the butadiene copolymerized rubber obtained by emulsion polymerization an aqueous medium, all the polybutadiene obtained by emulsion polymerization or butadiene-styrene copolymerized rubber has been subjected to cross linking of molecular structure thereof during the polymerization. And even though the cross linking reaction may be further effected according to the present invention, the effect thereof is not so remarkable that the polybutadiene obtained by solution polymerization using a Ziegler type catalyst or lithium based catalyst is effective.

The linkage of the 1,3-butadiene contained in an amount of at least 10% by weight in the synthetic rubber obtained by solution polymerization is usually 20-98% cis-1,4-linkage and the remainder is trans-1,4-linkage and 1,2-linkage.

As the monomer which is copolymerized with 1,3-butadiene, there are exemplified ethylene, propylene, butene-1, isoprene, styrene, aromatic substituted styrene such as 2-methylstyrene, 3-methylstyrene, 4-methylstyrene, 2,4-dimethylstyrene, 3,5-dimethylstyrene, 2,4,6-trimethylstyrene, 2,3,4,5,6-pentamethylstyrene, phenylbutadiene, 2-vinylnaphthalene, various monovinylanthracenes, acrylonitrile, methacrylonitrile, and acrylic acid esters. The above monomers may be employed in the copolymerization with 1,3-butadiene singly or as a mixture of two or more.

The kind of polymerization catalyst, the proportion by weight thereof to the monomer, the polymerization temperature and time may be selected depending on the kind or composition of the monomer.

One of the synthetic rubbers to which the present invention may be applied is a high cis-polybutadiene prepared in the presence of a so-called Ziegler type catalyst. This rubber is polymerized in solution by the use of a combined catalyst such as triisobutylaluminum and titanium tetraiodide, tributylaluminum and titanium tetrachloride and titanium tetraiodide, triethylaluminum and titanium tetrachloride and iodine, diethylaluminum chloride and cobalt chloride, triethylaluminum and vanadium oxychloride, triethylaluminum and boron trifluoride and nickel naphthenate. Additionally, the other of said synthetic rubbers is a relatively lower cispolybutadiene which is solution polymerized in the presence of a so-called lithium based catalyst such as metallic lithium, methyllithium, ethyllithium, propyllithium, butyllithium, amyllithium, hexyllithium, 2-ethylhexyllithium, phenyllithium, various tolyllithium, methylenedilithium, pentamethylenedilithium or 1,2-dilithostilbene.

Moreover, as a catalyst for the copolymerization of 1,3-butadiene with styrene, isoprene and the like to which the present treating method can also be applied, an alfine type catalyst, which is a combined catalyst of sodium chloride, allylsodium and alkoxysodium is suitable in addition to the above lithium based catalysts.

The cross linking in the synthetic rubber according to the present method takes place preferentially in the 1,3- butadiene portion of the synthetic rubber. Therefore the method is specifically effective when applied to polybutadiene. Moreover, the method may be applied effectively to any synthetic rubber containing more than 10% by weight of 1,3-butadiene substantially without a wide difference from the case of polybutadiene rubber.

As mentioned above, the linkages of the 1,3-butadiene portion are classified roughly into cis-1,4-linkage, trans-1,4-linkage and 1,2-linkage. The application of the present invention is not influenced to any great degree by the difference in stereostructure.

Thus, the synthetic rubber or oil extended synthetic rubber which is processed according to the present invention is excellent in processability and practicability. Therefore, general rubber product articles obtained from such materials are excellent in their physical properties. The utility thereof is of a remarkably wide range, for instance, tire carcass, tire tread, belt, industrial articles, cellular articles, automotive parts and the like.

When general rubber product articles are manufactured, natural rubber or synthetic rubber which is not processed according to the present invention, such as butadiene-styrene copolymerized rubber which is emulsion polymerized, or polybutadiene rubber or oil extended rubber of copolymerized rubber thereof or polybutadiene, solution polymerized polyisoprene, chloroprene type synthetic rubber, emulsion polymerized butadiene-acrylonitrile copolymerized rubber, emulsion polymerized butadiene-methacrylate copolymerized rubber, ethylene-propylene type synthetic rubber may be employed by mixing some in any proportion and they are useful for improving the processability and practicability of these rubbers. If the content of synthetic rubber which has been treated according to the present invention is not at least more than 20% by weight, the effect of the present invention can not be expected.

The raw material rubber which has been treated according to the present invention is mixed with process oil, various fillers, accelerators, curatives, stearic acid, zinc oxide, reclaimed rubber and the like. Thereafter it is cured and submitted to practical uses. Among such compounding ingredients, process oil and various fillers are important.

The fillers are roughly divided into two groups corresponding to the object for which compounding is performed. One filler is one which is employed to improve the practicability of cured rubber product articles such as abrasion resistance and hardness, and various carbon black, pulverized silicic anhydride and the like are involved in said fillers.

The other filler is one which is employed as an extender and compounds for processing aid. There are exemplified calcium carbonate, calcium silicide, calcium carbonate coated over the surface of fatty acids, magnesium carbonate, magnesium oxide, zinc oxide, titanium oxide, clay, alumina and talc.

In view of the utility and cost, combined fillers selected from the above two groups should be used in practice.

The compounding amount of the filler is required to contain 10–400 parts by weight per 100 parts by weight of raw material rubber. When the content is less than 10 parts by weight, the practicability of almost all of the rubber product articles is insufficient. On the contrary, when the content is more than 400 parts by weight, the practicability, specifically abrasion resistance and dynamic properties are deteriorated.

Next, the process oil which is important as a compounding ingredient is generally classified with regard to its V.G.C. (Viscosity Gravity Constant), into paraffinic process oil (V.G.C. 0.790–0.849), naphthenic process oil (V.G.C. 0.850–0.899) and aromatic process oil (V.G.C. more than 0.900Q. All of the above process oils may be used in the raw material rubber containing the synthetic rubber treated according to the present invention. The compounding amount should be 5–100 parts by weight per 100 parts by weight of the raw material rubber.

When the content of process oil is less than 5 parts by weight, there is a disadvantage as to the processability and when the content is more than 100 parts by weight, the practicability of the rubber is deteriorated.

Generally, the above compounding ingredients may be mixed mechanically on a Banbury mixer or may be previously mixed when the raw material rubber is in solution state.

The present treating method can be carried out very easily on an industrial scale and the cost does not increase. The synthetic rubber processed according to the present processing method is exceedingly excellent in flow property, processability and practicability. Accordingly, it can be said that the present invention is of great significance not only to the maker of synthetic rubbers but also the user of synthetic rubbers and further the users of rubber product articles comprising such synthetic rubbers.

The following examples explain the effect of present invention. However, such examples are given by way of illustration and not by way of limitation of the present invention which is defined in the appended claims.

EXAMPLE I

Maleic anhydride or maleic acid, azobisisobutyronitrile, triethylaluminum or diethylaluminum chloride or propylaluminum dichloride are added to a 20% by weight n-hexane solution of polybutadiene rubber (34.0% of cis 1,4-linkage, 57.0% of trans 1,4-linkage and 9% of 1,2-linkage) which is obtained by adding 0.06 part by weight of n-butyllithium per 100 parts by weight of 1,3-butadiene to a 20% by weight n-hexane solution of 1,3-butadiene and polymerized in an atmosphere of nitrogen at 50° C. for 3 hours and further at 85° C. for 1 hour, and reacted at a constant temperature with stirring and the n-hexane is removed, thereby to obtain a cross linked polybutadiene. The results are shown in Table 1.

As shown in Table 1, when triethylaluminum or diethylaluminum chloride is added to the combined system of azobisisobutyronitrile and maleic anhydride, the reaction velocity is exceedingly rapid and the maximum Mooney viscosity reached is high.

TABLE I [1]

| No. of Sample | Added amount of maleic anhydride | Added amount of maleic acid | Added amount of azobisisobutyronitrile | Added amount of triethylaluminum | Added amount of diethylaluminum chloride | Added amount of propylaluminum dibromide | Reaction temperature, °C. | Time to reach final Mooney viscosity, hour | Finally reached Mooney viscosity | Gel content percent |
|---|---|---|---|---|---|---|---|---|---|---|
| A | 0.20 | 0 | 0.4 | 0 | 0 | 0 | 70 | 8 | 30.0 | 0.01 |
| B | 0.20 | 0 | 0.2 | 0.20 | 0 | 0 | 70 | 4 | 55.0 | 0.01 |
| C | 0.40 | 0 | 0.4 | 0 | 0 | 0 | 90 | 6 | 75.0 | 0.02 |
| D | 0.40 | 0 | 0.2 | 0.20 | 0 | 0 | 90 | 3 | 105.0 | 0.01 |
| E | 0 | 0.30 | 0.50 | 0 | 0 | 0 | 80 | 7 | 65.0 | 0.01 |
| F | 0 | 0.30 | 0.20 | 0.25 | 0 | 0 | 80 | 4 | 136.0 | 0.02 |
| G | 0 | 0.40 | 0.20 | 0 | 0 | 0 | 50 | 12 | 34.0 | 0.01 |
| H | 0 | 0.40 | 0.40 | 0.30 | 0 | 0 | 50 | 6 | 82.0 | 0.02 |
| I | 0.40 | 0 | 0.2 | 0 | 0.20 | 0 | 90 | 3 | 95.0 | 0.03 |
| J | 0.40 | 0 | 0.2 | 0 | 0 | 0.20 | 90 | 2.5 | 98.0 | 0.02 |

[1] All parts of amounts of various additives are parts by weight per 100 parts by weight of polybutadiene rubber.

What we claim is:

1. A method for treating synthetic rubber, said method comprising mixing a solution polymerized synthetic rubber containing at least 10% by weight of 1,3-butadiene with 0.005-2 parts by weight of at least one member selected from the group consisting of maleic anhydride and maleic acid, 0.05-5 parts by weight of azobisisobutyronitrile and 0.01-10 parts by weight of an organic aluminum compound of the formula:

$$AlR_nX_{3-n}$$

wherein R is a lower alkyl group, X is at least one halogen selected from the group consisting of bromine, chlorine and iodine and n is an integer from 0 to 3 per 100 parts by weight of said synthetic rubber to form a mixture and heating said mixture at 20°–150° C. for a period of 10 minutes to 200 hours, the treated synthetic rubber containing less than 5% by weight of gel.

2. A method according to claim 1, wherein the solution polymerized synthetic rubber is polybutadiene, butadiene-styrene copolymer or butadiene-isoprene copolymer.

3. A method according to claim 1, wherein the organic aluminum compound is trimethylaluminum, triethylaluminum, tripropylaluminum, tributylaluminum, dimethylaluminum bromide, dimethylaluminum chloride, diethylaluminum chloride, methylaluminum dichloride, ethylaluminum dichloride, methylaluminum dibromide and ethylaluminum dichloride.

4. A rubber composition comprising 5-100 parts by weight of a process oil and 10-400 parts by weight of filler per 100 parts by weight of a raw material rubber containing at least 20% by weight of a synthetic rubber treated according to the method as claimed in claim 1.

5. A molded, vulcanized rubber product article comprising the rubber composition claimed in claim 4.

References Cited

UNITED STATES PATENTS

| | | | |
|---|---|---|---|
| 3,062,802 | 11/1962 | Cunneen et al. | 260—94.7 |
| 3,094,514 | 6/1963 | Tucker | 260—94.7 |

FOREIGN PATENTS

| | | |
|---|---|---|
| 1,336,414 | 7/1963 | France. |
| 952,021 | 3/1964 | Great Britain. |

OTHER REFERENCES

Pinazzi et al.: Chemical Abstracts 57, 1002–1003 (1962).

MORRIS LIEBMAN, Primary Examiner

H. H. FLETCHER, Assistant Examiner

U.S. Cl. X.R.

252—431; 260—41.5, 94.2, 94.7, 878, 879